(12) United States Patent
Reunamaki et al.

(10) Patent No.: US 9,042,828 B2
(45) Date of Patent: May 26, 2015

(54) METHOD, APPARATUS, AND COMPUTER PROGRAM PRODUCT FOR OPTIMIZED DISCOVERY BETWEEN MOBILE DEVICES

(71) Applicant: Nokia Corporation, Espoo (FI)

(72) Inventors: Jukka Reunamaki, Tampere (FI); Tuomas Laine, Vantaa (FI)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 13/684,860

(22) Filed: Nov. 26, 2012

(65) Prior Publication Data

US 2014/0148099 A1 May 29, 2014

(51) Int. Cl.
*H04B 7/00* (2006.01)
*H04W 52/02* (2009.01)

(52) U.S. Cl.
CPC ................... *H04W 52/0209* (2013.01)

(58) Field of Classification Search
CPC .......................... H04W 4/008; H04W 72/0446
USPC .................. 455/41.2, 343.1, 343.2, 522, 574; 370/310, 350, 458, 459
See application file for complete search history.

(56) References Cited

U.S. PATENT DOCUMENTS

| | | | |
|---|---|---|---|
| 5,371,734 A | 12/1994 | Fischer | |
| 6,941,372 B2 | 9/2005 | Pearson | |
| 7,567,673 B2 | 7/2009 | Fukuzawa et al. | |
| 7,590,100 B2 | 9/2009 | Smith et al. | |
| 7,774,495 B2 | 8/2010 | Pabla et al. | |
| 7,848,277 B2 | 12/2010 | Chou et al. | |
| 7,864,720 B2 | 1/2011 | Jeyaseelan | |
| 7,907,557 B2 | 3/2011 | Carter | |
| 8,005,032 B2 | 8/2011 | Wang et al. | |
| 8,014,378 B1 | 9/2011 | Yoon et al. | |
| 8,542,620 B2 * | 9/2013 | Sampathkumar | 370/311 |
| 8,605,634 B2 * | 12/2013 | Jeon et al. | 370/310 |
| 8,625,571 B2 * | 1/2014 | Sakoda | 370/350 |
| 2002/0101446 A1 | 8/2002 | Tang et al. | |

(Continued)

FOREIGN PATENT DOCUMENTS

| | | |
|---|---|---|
| EP | 1 361 728 | 11/2003 |
| EP | 1 396 986 | 3/2004 |

(Continued)

OTHER PUBLICATIONS

International Search Report mailed Sep. 10, 2010 in International Application Serial No. PCT/IB2010/052403, 4 pgs.

(Continued)

*Primary Examiner* — Sonny Trinh
(74) *Attorney, Agent, or Firm* — Locke Lord LLP

(57) ABSTRACT

Method, apparatus, and computer program product example embodiments enable optimized discovery between mobile devices. In example embodiments, a method comprises transmitting, by a wireless device, a periodic beacon message, the beacon message including an indication that the wireless device is currently unconnectable and indicating a next awake period and response opportunity for connecting the wireless device; entering, by the wireless device, a sleep state until the next awake period; awaking from the sleep state for transmitting the periodic beacon message and determining whether the awake period contains a response opportunity; and when determining that the awake period contains a response opportunity, remaining in an awake state for listening for responses to the periodic beacon message.

18 Claims, 10 Drawing Sheets

(56) References Cited

U.S. PATENT DOCUMENTS

| | | |
|---|---|---|
| 2003/0204742 A1 | 10/2003 | Gupta et al. |
| 2004/0153676 A1 | 8/2004 | Krantz et al. |
| 2005/0025092 A1 | 2/2005 | Morioka et al. |
| 2005/0068928 A1 | 3/2005 | Smith et al. |
| 2005/0128988 A1 | 6/2005 | Simpson et al. |
| 2005/0193106 A1 | 9/2005 | Desai et al. |
| 2006/0034217 A1 | 2/2006 | Kwon et al. |
| 2006/0050730 A1 | 3/2006 | Shvodian |
| 2006/0120314 A1 | 6/2006 | Krantz |
| 2006/0215588 A1 | 9/2006 | Yoon |
| 2006/0251004 A1 | 11/2006 | Zhong et al. |
| 2006/0285510 A1 | 12/2006 | Kim et al. |
| 2007/0002866 A1 | 1/2007 | Belstner et al. |
| 2007/0086424 A1 | 4/2007 | Calcev et al. |
| 2007/0086426 A1 | 4/2007 | Bonta et al. |
| 2007/0127427 A1 | 6/2007 | Tanaka |
| 2007/0226777 A1 | 9/2007 | Burton et al. |
| 2007/0254596 A1 | 11/2007 | Corson et al. |
| 2008/0025512 A1 | 1/2008 | Nakajima |
| 2008/0125190 A1 | 5/2008 | Jan et al. |
| 2008/0130543 A1 | 6/2008 | Singh et al. |
| 2008/0151848 A1 | 6/2008 | Fischer et al. |
| 2009/0073871 A1 | 3/2009 | Ko et al. |
| 2009/0147702 A1 | 6/2009 | Buddhikot et al. |
| 2009/0203926 A1 | 8/2009 | Robbins et al. |
| 2009/0247201 A1 | 10/2009 | Ye et al. |
| 2009/0279449 A1 | 11/2009 | Kneckt et al. |
| 2009/0310571 A1 | 12/2009 | Matischek et al. |
| 2010/0110948 A1 | 5/2010 | Batta |
| 2010/0111066 A1 | 5/2010 | Mehta |
| 2010/0157827 A1 | 6/2010 | Park et al. |
| 2010/0165947 A1 | 7/2010 | Taniuchi et al. |
| 2010/0189082 A1 | 7/2010 | Choi et al. |
| 2010/0226297 A1 | 9/2010 | Kasslin et al. |
| 2010/0226309 A1 | 9/2010 | Kasslin et al. |
| 2010/0302947 A1 | 12/2010 | Leppanen et al. |
| 2010/0304759 A1 | 12/2010 | Leppanen et al. |
| 2010/0332683 A1 | 12/2010 | Das et al. |
| 2011/0038349 A1 | 2/2011 | Sun et al. |
| 2011/0065440 A1 | 3/2011 | Kakani |
| 2011/0141966 A1 | 6/2011 | Kasslin et al. |
| 2011/0142028 A1 | 6/2011 | Kasslin et al. |
| 2011/0142029 A1 | 6/2011 | Kasslin et al. |

FOREIGN PATENT DOCUMENTS

| | | |
|---|---|---|
| EP | 1 545 146 | 6/2005 |
| EP | 1 703 701 | 9/2006 |
| EP | 2 107 732 | 10/2009 |
| WO | WO2004091246 | 10/2004 |
| WO | WO2005006658 | 1/2005 |
| WO | WO2008075264 | 6/2008 |
| WO | WO2008094107 | 8/2008 |
| WO | WO2009113798 | 9/2009 |
| WO | WO2010029386 | 3/2010 |

OTHER PUBLICATIONS

International Search Report mailed Jun. 4, 2010 in International Application Serial No. PCT/FI2010/050069, 4 pgs.

Cavalcanti et al., IEEE 802.22-07/0121r1: Proposed text changes to Section 6.21.2 Self-coexistence in IEEE 802.22/DO.2 Draft Standard: published Mar. 2007, 26 pgs.

Cordeiro et al, "Cognitive PHY and MAC layers for Dynamic Spectrum Access and Sharing of TV Bands", published by ACM on Aug. 5, 2006, 11 pgs.

International Search Report search completed Feb. 3, 2011 in International Application Serial No. PCT/FI2010/050801, 4 pgs.

International Search Report search completed Feb. 24, 2011 in International Application Serial No. PCT/FI2010/050803, 4 pgs.

International Search Report search completed Jan. 21, 2011 in International Application Serial No. PCT/FI2010/050838, 4 pgs.

Gao, Y. Optimal size for 802.11 networks in ad hoc mode: DoCoMO Communications Lab US, dd Sep. 2003, 4 pgs.

Jung, E. et al., An Energy Efficient MAC Protocol for Wireless LANs:, Technical Report TR01-017, Dept. of Computer Science, Texas A & M University, Jul. 31, 2001, 11 pgs.

Wang, Q. et al., AwareWare: An adaptation Middleware for Heterogeneous Environments:, IEEE Communications Society, 2004, 6 pgs.

WiFi Alliance Technical Committee Quality of Service (QoS) Task Group, WMMTM (including WMMTM Power Save Specification), Version 1.1, 36 pgs.

International Search Report dated May 10, 2010 in International Application Serial No. PCT/FI2010/050071, 4 pgs.

IEEE 802.11-2007, Wireless Medium Access Control (MAC) and Physical Layer (PHY) Specifications, Jun. 2007, Chapter 7.2.3.1 entitled "Beacon frame format", (pp. 80-81).

H. Chen, et al, IEEE P802.11; doc.:IEEE 802.11-10/0828r0, Wireless LANs, Normative Text for 5 MHz Measurement Pilot Frame, Jun. 2010, pp. 1-4.

L. Wang, et al, Proposed SFD Text for 802.11ai, doc.: IEEE 11-12-0406-02-00ai; Passive Scanning Improvement, dd May 4, 2012; pp. 1-15.

\* cited by examiner

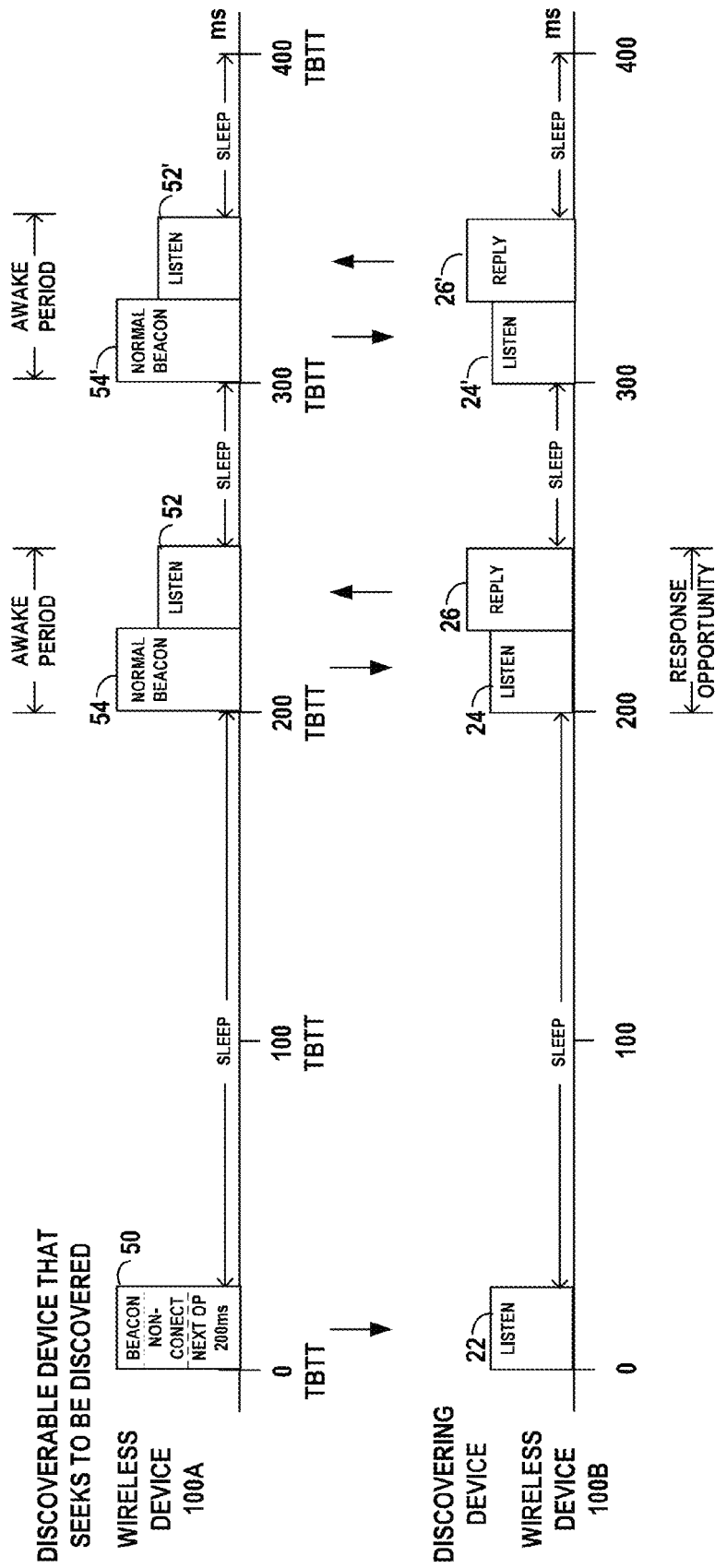

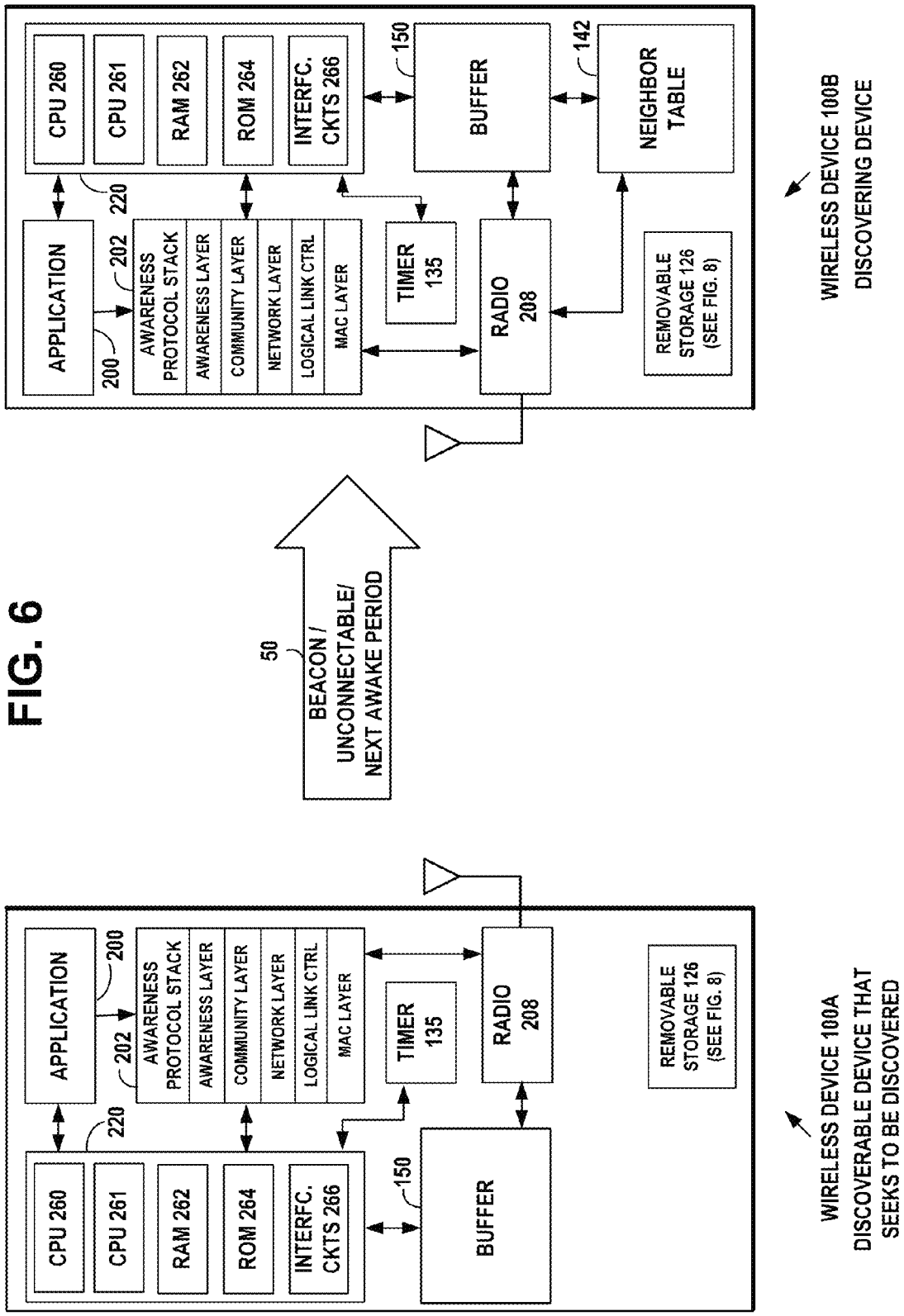

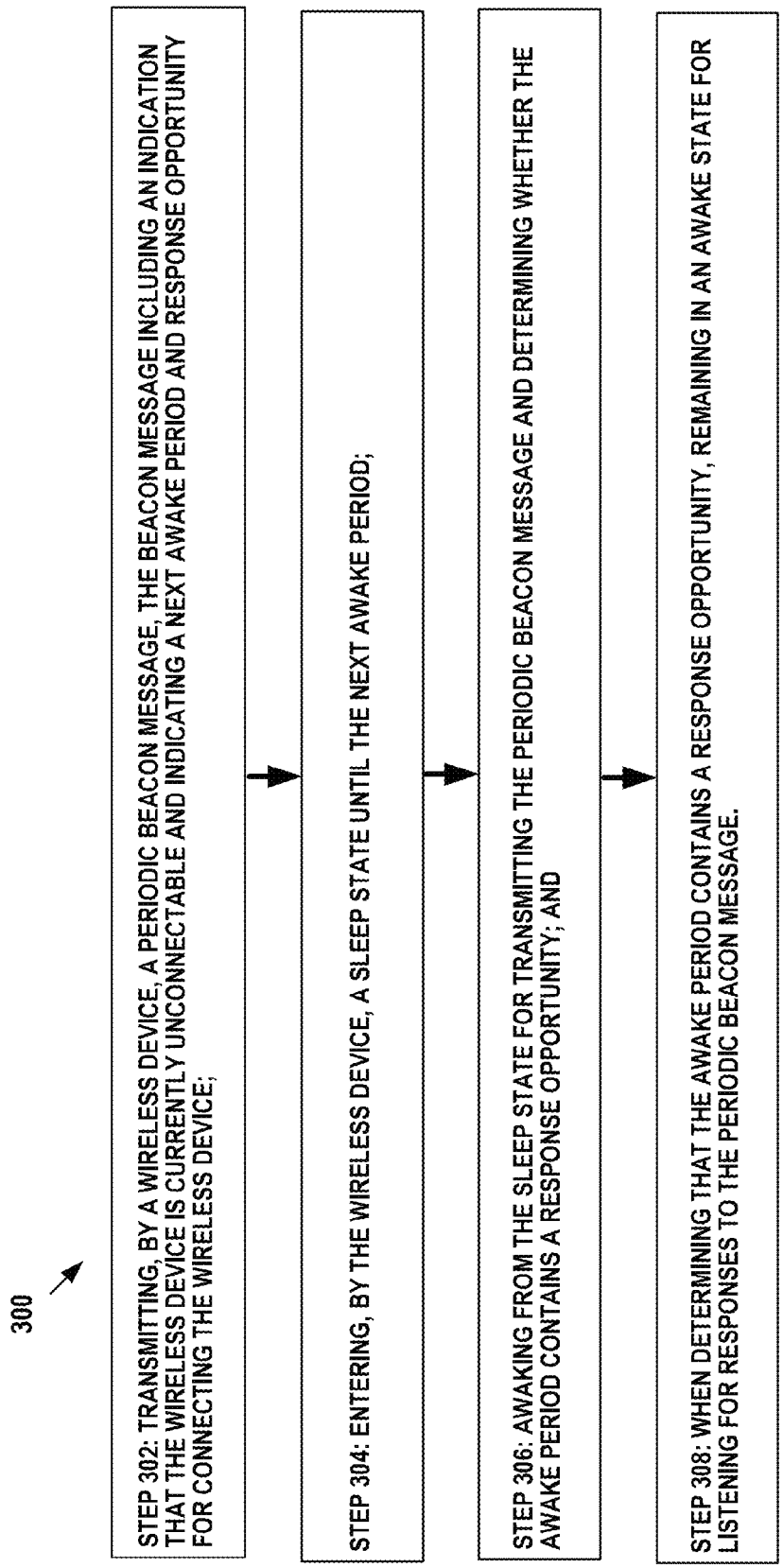

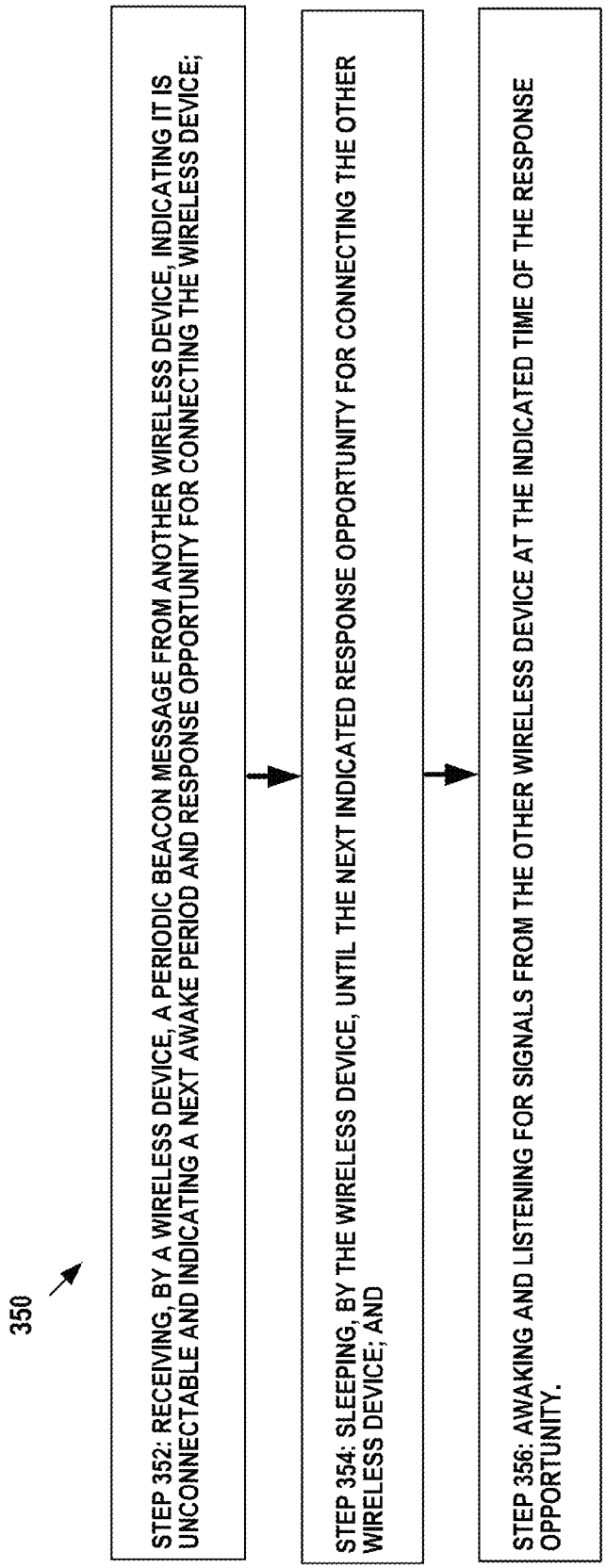

METHOD, APPARATUS, AND COMPUTER PROGRAM PRODUCT FOR OPTIMIZED DISCOVERY BETWEEN MOBILE DEVICES

FIELD

The field of the invention relates to wireless short-range communication and more particularly to exchanging information between wireless devices.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable optimized discovery between mobile devices.

According to an example embodiment of the invention, a method comprises:

transmitting, by a wireless device, a periodic beacon message, the beacon message including an indication that the wireless device is currently unconnectable and indicating a next awake period and response opportunity for connecting the wireless device;

entering, by the wireless device, a sleep state until the next awake period;

awaking from the sleep state for transmitting the periodic beacon message and determining whether the awake period contains a response opportunity; and when determining that the awake period contains a response opportunity, remaining in an awake state for listening for responses to the periodic beacon message.

According to an example embodiment of the invention, a method comprises:

wherein the periodic beacon message indicates that a connection setup is possible only after a later beacon or an indicated time.

According to an example embodiment of the invention, a method comprises:

transmitting, by the wireless device, a later beacon message after determining that the awake period contains a response opportunity, to indicate the response opportunity to devices receiving the later beacon message.

According to an example embodiment of the invention, a method comprises:

selecting, by the wireless device, a new duration before the next awake period and response opportunity;

transmitting, by the wireless device, another periodic beacon message indicating it is unconnectable and indicating the new duration before the next awake period and response opportunity;

entering, by the wireless device, a sleep state for the new duration;

awaking from the sleep state for transmitting the periodic beacon message and determining whether the awake period contains a response opportunity; and when determining that the awake period contains a response opportunity, remaining in the awake state for listening for responses to the periodic beacon message.

According to an example embodiment of the invention, a method comprises:

receiving, by a wireless device, a periodic beacon message from another wireless device, indicating it is unconnectable and indicating a next awake period and response opportunity for connecting the wireless device;

sleeping, by the wireless device, until the next indicated response opportunity for connecting the other wireless device; and awaking and listening for signals from the other wireless device at the indicated time of the response opportunity.

According to an example embodiment of the invention, a method comprises:

wherein the periodic beacon message indicates that a connection setup is possible only after a later beacon or an indicated time.

According to an example embodiment of the invention, a method comprises:

receiving, by the wireless device, a later periodic beacon message at the response opportunity to indicate a response opportunity to devices receiving the second message.

According to an example embodiment of the invention, a method comprises:

receiving, by the wireless device, another periodic beacon message indicating it is unconnectable and indicating the new duration before the next awake period and response opportunity;

entering, by the wireless device, a sleep state for the new duration before the next indicated response opportunity for connecting the other wireless device; and awaking from the sleep state at the end of the new duration and listening for signals from the other wireless device indicating a response opportunity.

According to an example embodiment of the invention, an apparatus comprises:

at least one processor;

at least one memory including computer program code;

the at least one memory and the computer program code configured to, with the at least one processor, cause the apparatus at least to:

transmit a periodic beacon message, the beacon message including an indication that the apparatus is currently unconnectable and indicating a next awake period and response opportunity for connecting the apparatus;

enter a sleep state until the next awake period;

awake from the sleep state for transmitting the periodic beacon message and determining whether the awake period contains a response opportunity; and when determining that the awake period contains a response opportunity, remaining in an awake state for listening for responses to the periodic beacon message.

According to an example embodiment of the invention, an apparatus comprises:

wherein the periodic beacon message indicates that a connection setup is possible only after a later beacon or an indicated time.

According to an example embodiment of the invention, an apparatus comprises:

the at least one memory and the computer program code configured to, with the at least one processor, cause the apparatus at least to:

transmit a later beacon message after determining that the awake period contains a response opportunity, to indicate the response opportunity to devices receiving the later beacon message.

According to an example embodiment of the invention, an apparatus comprises:

the at least one memory and the computer program code configured to, with the at least one processor, cause the apparatus at least to:

selecting, by the wireless device, a new duration before the next awake period and response opportunity;

transmit another periodic beacon message indicating it is unconnectable and indicating the new duration before the next awake period and response opportunity;

enter a sleep state for the new duration;

awake from the sleep state for transmitting the periodic beacon message and determining whether the awake period contains a response opportunity; and when determining that the awake period contains a response opportunity, remain in the awake state for listening for responses to the periodic beacon message.

According to an example embodiment of the invention, an apparatus comprises:

at least one processor;

at least one memory including computer program code;

the at least one memory and the computer program code configured to, with the at least one processor, cause the apparatus at least to:

receive a periodic beacon message from another wireless device, indicating it is unconnectable and indicating a next awake period and response opportunity for connecting the apparatus;

sleep until the next indicated response opportunity for connecting the other wireless device; and awake and listen for signals from the other wireless device at the indicated time of the response opportunity.

According to an example embodiment of the invention, an apparatus comprises:

wherein the periodic beacon message indicates that a connection setup is possible only after a later beacon or an indicated time.

According to an example embodiment of the invention, an apparatus comprises:

the at least one memory and the computer program code configured to, with the at least one processor, cause the apparatus at least to:

receive a later periodic beacon message at the response opportunity to indicate a response opportunity to devices receiving the second message.

According to an example embodiment of the invention, an apparatus comprises:

the at least one memory and the computer program code configured to, with the at least one processor, cause the apparatus at least to:

receive another periodic beacon message indicating it is unconnectable and indicating the new duration before the next awake period and response opportunity;

enter a sleep state for the new duration before the next indicated response opportunity for connecting the other wireless device; and awake from the sleep state at the end of the new duration and listen for signals from the other wireless device indicating a response opportunity.

According to an example embodiment of the invention, a computer program product comprises computer executable program code recorded on a computer readable non-transitory storage medium, the computer executable program code comprising:

code for transmitting, by a wireless device, a periodic beacon message, the beacon message including an indication that the wireless device is currently unconnectable and indicating a next awake period and response opportunity for connecting the wireless device;

code for entering, by the wireless device, a sleep state until the next awake period;

code for awaking from the sleep state for transmitting the periodic beacon message and determining whether the awake period contains a response opportunity; and code for when determining that the awake period contains a response opportunity, remaining in an awake state for listening for responses to the periodic beacon message.

According to an example embodiment of the invention, a computer program product comprises computer executable program code recorded on a computer readable non-transitory storage medium, the computer executable program code comprising:

code for receiving, by a wireless device, a periodic beacon message from another wireless device, indicating it is unconnectable and indicating a next awake period and response opportunity for connecting the wireless device;

code for sleeping, by the wireless device, until the next indicated response opportunity for connecting the other wireless device; and code for awaking and listening for signals from the other wireless device at the indicated time of the response opportunity.

The resulting example embodiments enable optimized discovery between mobile devices.

DESCRIPTION OF THE FIGURES

FIG. 5 illustrates an example timing diagram of the first device of FIG. 1, transmitting a first beacon indicating it is unconnectable and indicating a next awake period and response opportunity, the figure further showing the first device entering a sleep mode and sleeping until the next awake period. The figure further shows the first device awaking from the sleep state and determining whether the awake period contains a response opportunity. In an example embodiment of the invention, if the awake period contains a response opportunity, the first device remains in an awake state for transmitting a normal beacon during the next awake period and response opportunity. The first device may then listen for responses to the special beacon or the normal beacon during the next awake period. After transmitting a normal beacon frame, the discoverable device that seeks to be discovered may remain awake and listen to the channel for some time interval in order to receive possible responses from discovering devices, triggered by the beacon frame. The figure further illustrates an example timing diagram of the second device of FIG. 1, receiving the first beacon indicating it is unconnectable and indicating a next awake period and response opportunity, entering a sleep mode and sleeping until the response opportunity, and then waking up and receiving the normal beacon during the response opportunity, and in response sending a reply packet, in accordance with at least one embodiment of the present invention.

FIG. 6 is an example functional block diagram of the two ad hoc wireless network devices of FIG. 1, with a first device, a discoverable device that seeks to be discovered, transmitting a first beacon indicating it is unconnectable, meaning that a connection setup is possible only after a later beacon or an indicated time. The first device may conserve energy by skipping the normal receiving period after transmitting the first beacon and returning directly to a sleep state. The first beacon also indicates a next awake period and response opportunity to a second device, a discovering device, enabling the second device to conserve energy by returning to a sleep state until close to the start of the indicated connection initiation opportunity, in accordance with at least one embodiment of the present invention.

FIG. 7A is an example flow diagram of operational steps in the first wireless device, the discoverable device that seeks to be discovered of FIG. 1, in accordance with at least one embodiment of the present invention.

FIG. 7B is an example flow diagram of operational steps in the second wireless device, the discovering device of FIG. 1, in accordance with at least one embodiment of the present invention.

DISCUSSION OF EXAMPLE EMBODIMENTS OF THE INVENTION

Figure 1:
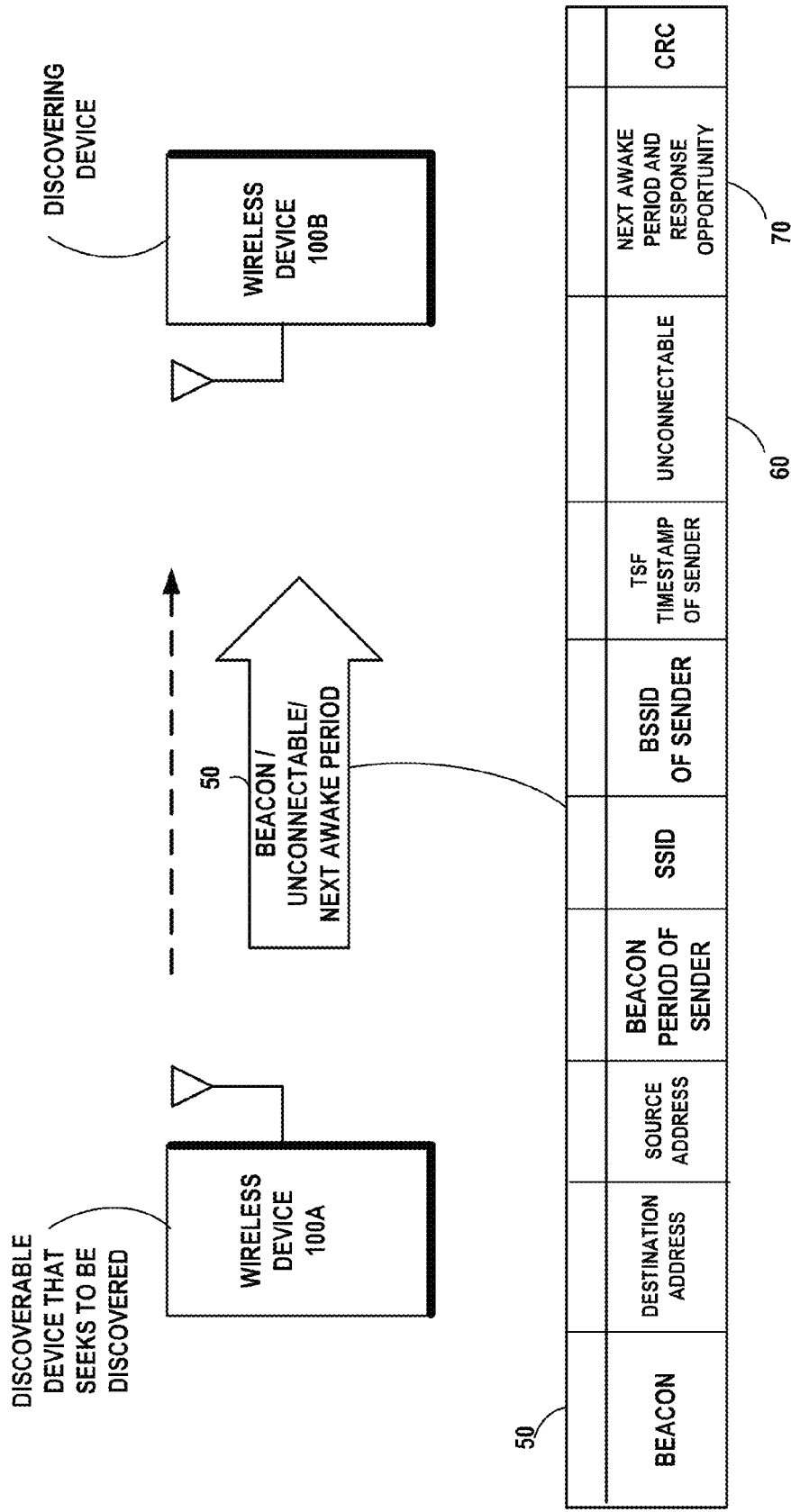
FIG. 1 illustrates an example network diagram including two ad hoc wireless network devices, with a first device, a discoverable device that seeks to be discovered, transmitting a first beacon indicating it is unconnectable, meaning that a connection setup is possible only after a later beacon or an indicated time. The first device may conserve energy by skipping the normal receiving period after transmitting the first beacon and returning directly to a sleep state. The first beacon also indicates a next awake period and response opportunity to a second device, a discovering device, enabling the second device to conserve energy by returning to a sleep state until close to the start of the indicated connection initiation opportunity, in accordance with at least one embodiment of the present invention. The figure also illustrates an example format of a beacon packet transmitted by the first device, which includes a field indicating the first device is unconnectable based on the first beacon and indicating a next awake period and response opportunity, in accordance with at least one embodiment of the present invention.

This section is organized into the following topics:
A. WLAN Communication Technology
B. Awareness Network Technology
C. Optimized Discovery Between Mobile Devices
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Since then, emerging broadband applications have stimulated interest in developing very high-speed wireless networks for short range communication, for example, the IEEE 802.11n, the planned IEEE 802.11 ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices or stations (STAs) in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timing synchronization function (TSF). The TSF may maintain a 64-bit timer running at 1 MHz and updated by information from other devices. When a device begins operation, it may reset the timer to zero. The timer may be updated by information received in beacon frames.

Each wireless device or STA maintains a TSF timer with modulus $2^{64}$ counting in increments of microseconds. STAs expect to receive Beacon frames at a nominal rate. The interval between Beacon frames is defined by a Beacon Period parameter of the STA. A STA sending a Beacon frame sets the value of the Beacon frame's timestamp so that it equals the value of the STA's TSF timer at the time that the data symbol containing the first bit of the timestamp is transmitted to the PHY plus the transmitting STA's delays through its local PHY from the MAC-PHY interface to its interface with the antenna or light-emitting diode (LED) emission surface.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TBTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

There are three major types of medium access control (MAC) frames in the IEEE 802.11 protocol: the management frame, the control frame, and the data frame. Management frames provide management services. Data frames carry payload data. Control frames assist in the delivery of data and management frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

1. Beacon

The beacon frame is a management frame that is transmitted periodically to allow mobile devices to locate and identify an ad hoc network. Beacon generation in an IBSS is distributed. The value of the beacon period is included in Beacon and Probe Response frames, and devices or STAs adopt that beacon period when joining the IBSS. All members of the IBSS participate in beacon generation. Each STA maintains its own TSF timer that is used for Beacon Period timing. The beacon interval within an IBSS is established by the STA when the START request primitive is performed within a device to create the IBSS. This defines a series of target beacon transmission times (TBTT) exactly a Beacon Period apart, which is the time at which an ad hoc device must send a beacon. Time zero is defined to be a TBTT. At each TBTT the STA waits for the random backoff interval and then sends a Beacon frame if the random delay has expired and no other Beacon frame has arrived from the IBSS of which the STA is a member during the delay period.

The beacon frame includes the fields: timestamp, beacon interval, and capability information. The timestamp contains the value of the device's synchronization timer (TSF) at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent. A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio may broadcast a probe request on the channel it is scanning using a broadcast SSID in the probe request. The WLAN radio will add any received beacons or probe responses to a cached basic service set identifier (BSSID) scan list. For passive scans, the WLAN radio does not send a probe request, but instead, listens on a channel for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BSSID to the broadcast MAC address in the probe request it sends. The WLAN radio performs the scan across all the frequency channels and bands that it supports.

3. Probe Response

Devices or STAs in an IBSS respond to probe requests if it is awake at a given time to receive and respond to the probe requests. In an IBSS, a STA that sent a Beacon frame remains in the Awake state and responds to probe requests, until a Beacon frame with the current BSSID is received. There may be more than one STA in an IBSS that responds to any given probe request, particularly in cases where more than one STA transmitted a Beacon frame following the most recent TBTT, either due to not receiving successfully a previous Beacon frame or due to collisions between beacon transmissions. In an IBSS, STAs receiving Probe Request frames respond with a probe response when the SSID in the probe request is the wildcard SSID or matches the specific SSID of the STA. In an IBSS a STA that transmitted a Beacon frame since the last TBTT responds to group addressed Probe Request frames. A STA in an IBSS responds to Probe Request frames sent to the individual address of the STA. Probe Response frames are sent as directed frames to the address of the STA that generated the probe request.

4. Device Discovery

Device discovery in WLAN device to device networking is based on either a passive or active scanning procedure. In either case both the discovering device and the discoverable device that seeks to be discovered, may be awake at the same time to exchange discovery information between each other. The total power consumption for WLAN device discovery is determined by the transmit and receive duty cycle during the discovery process.

The discoverable device that seeks to be discovered by other devices, may transmit periodic beacon frames that carry some amount of payload data within the frame body. Depending on the application, the beacon contains multiple, variable length information element fields that include relevant WLAN system functionality data. Typically the WLAN beacon interval is set to 100 ms. After transmitting a beacon frame, the discoverable device that seeks to be discovered may remain awake and listen to the channel for some time interval in order to receive possible responses from discovering devices, triggered by the beacon frame.

In the passive scanning mode a discovering device may not transmit any frames, but only listen for beacon frames from discoverable devices that wish to be discovered.

Active scanning by a discovering device may be based on transmitting Probe Request frames on a channel in order to discover existing devices or networks. If a discoverable device that seeks to be discovered, is in listening mode and receives a Probe Request frame from a discovering device, the discoverable device may respond with a Probe Response frame containing similar payload data as in a Beacon frame.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon the IEEE 802.11 ad hoc mode or independent basic service set (IBSS), in which every device participates in beaconing and all the other basic operations that keep the ad hoc network in operation. An ad hoc network is designed to have one service set identifier (SSID) that all of the devices in the network share. The SSID is announced in the beacons transmitted by the devices. The basic service set identifier (BSSID) is intended to represent a beacon group of devices or network instance, rather than the whole network itself. The devices announce the BSSID they use and follow, in the beacons they transmit. In the overall design, those devices that operate under same SSID are driven to use a common and shared BSSID, since the BSSID of a wireless device in an ad hoc network becomes the BSSID of the oldest network instance value in the network. The determination of which BSSID is used by a device is made by the network instance timer value, and this timer value is communicated in beacons in the timing synchronization function (TSF) value parameter. The devices are required to operate by assuming the oldest TSF value (i.e. largest TSF value) contained in the received beacons that represent the network with the SSID in which the devices are operating. When a device receives a beacon with an SSID that is the same as that in the network in which the device is operating, and if the TSF value in the beacon is larger than the device's own TSF counter value, then one of two alternative steps takes place. If the BSSID in the beacon is the same as the device's own BSSID, then the MAC adopts the TSF value (normal synchronization). Alternately, if the BSSID in the beacon is the not the same as the device's own BSSID, then the MAC passes the beacon to the LLC. The LLC then decides to join to the beacon group and passes the BSSID and the ATSF to the MAC.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network.

When the radio and MAC of a wireless device receives a Beacon from another network instance during scanning, it passes to the Logical Link Control (LLC) layer of the wireless device: 1) its own TSF counter value at the time when the Beacon was received, and 2) the TSF value of the received Beacon (the other TSF). When the radio and MAC of a wireless device receives a beacon response message, the MAC passes to the Logical Link Control (LLC) layer of the wireless device, the beacon response message (including the other TSF) together with receiver's own TSF counter value at the time when the message was received.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision is performed when a device receives a Beacon or beacon response message with an older (greater) TSF value from another wireless device. Two devices belong to different network instances 1) if their BSSIDs (network instance identifiers) are different; or 2) if their BSSIDs are the same and their TSF difference is greater than a fixed constant threshold value (for example 1000 μs). After the merging decision has been performed by a device, the device moves into the new network instance.

The awareness functionality in a short-range wireless device is divided between four layers in the awareness architecture. The Awareness Layer and the Community Layer provide services for applications, i.e. provide the awareness API. The approximate functional split between the different layers is as follows.

Awareness Layer

Awareness Layer (AwL) has the highest level of control of the awareness architecture. The most important services the AwL offers to the applications are Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer has an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

Awareness architecture has three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and can receive awareness community messages (public community). In a peer community all members are equal and every member may receive all the community specific messages. A peer community may be public, or it may be private meaning that community messages are encrypted using a temporary key derived from the community specific shared key. The encryption function is Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members are encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices will retransmit each message (normal flooding). The awareness network has a flat hierarchy; none of the devices may assume any special roles. Thus, at high densities, all the devices will transmit approximately the same amount of traffic (no clustering). The Network layer also takes care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer is divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given channel using the TransmitData functionality. Transmission may succeed or it may fail. Internally the Link Layer may try transmissions several times if a channel is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC, the LLC does the following WLAN MAC specific actions:

Control (Reset, Configure) WLAN MAC.

Decide when to merge WLAN networks.

Construct a message package to be sent to WLAN MAC from outgoing messages.

Select which messages are to be sent and which are ignored immediately, e.g. if there are too many messages to be sent.

Extract incoming data messages contained in reception reports.

Update the Neighbor Table when reception reports and scan reports are received.

Merging of WLAN networks is the responsibility of the logical link control (LLC). The LLC determines when to merge two WLAN network instances or beacon groups as a single larger network instance or a beacon group. LLC calculates an estimate of its own WLAN network size. Estimation is based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

The merging or joining process is a purely local process that occurs entirely internally to the wireless device. The Awareness Layer of the wireless device may make a merging or join decision to join a particular network instance or beacon group, either autonomously, in response to an application, or in response to user input. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation The propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

Current awareness applications employ the standard IEEE 802.11 WLAN ad hoc Join-command to implement a move from one instance to another. In the standard IEEE 802.11 WLAN ad hoc Join-command, if all network instances share the same BSSID, then the standard Join-command does not provide means to control to which network instance, of several possible candidate network instances, a device is requested to move. In the standard IEEE 802.11 WLAN ad hoc Join-command, if all of the network instances have the same BSSID, the Beacons contain no distinctive network instance identifier and thus there is no means to control to which network instance the command is directed. Therefore, the standard IEEE 802.11 WLAN ad hoc Join-mechanism may make the device move its operations back to its original own network instance, or some other proximate network instance with the oldest TSF value.

C. Optimized Discovery Between Mobile Devices

Method, apparatus, and computer program product example embodiments enable optimized discovery between mobile devices. FIG. 1 illustrates an example network diagram including two ad hoc wireless network devices 100A and 100B. In an example embodiment of the invention, an application running in the device 100A commands the device to seek to be discovered by any other wireless devices within communication range, by transmitting beacons and receiving responses, such as probe requests or beacon response messages from other wireless devices. The wireless device 100A maintains its own TSF timer that is used for Beacon Period timing. A beacon interval is established by the device 100A when it begins discovery, which defines a series of TBTTs exactly a Beacon Period apart. When operating according to the IEEE 802.11 standard, at each TBTT, the wireless device 100A waits for a random backoff interval and then sends a normal, standard Beacon frame if the random delay has expired and no other Beacon frame has arrived from another device during the delay period.

In accordance with an example embodiment of the invention, a novel mechanism substantially reduces the average power consumption of device discovery between mobile devices by making some beacons unconnectable, that is, connection setup is possible only after certain beacons or at some other indicated time. The beaconing device may choose to skip the receiving period after transmitting a special beacon frame and return directly to sleep state. In this case the special beacon frame may include schedule information about next awake period and response opportunity.

The first device 100A, is a discoverable device that seeks to be discovered, by transmitting a special beacon 50 indicating it is unconnectable, meaning that a connection setup is possible only after a later beacon or an indicated time. The first device 100A may conserve energy by skipping the normal receiving period after transmitting the special beacon 50 and returning directly to a sleep state. The special beacon 50 may also indicate a next awake period and response opportunity to the second device 100B, a discovering device, enabling the second device 100B to conserve energy by returning to a sleep state until close to the start of the indicated connection initiation opportunity, in accordance with at least one embodiment of the present invention. The figure also illustrates an example format of the beacon packet 50 transmitted by the first device 100A, which includes a field 60 indicating the first device 100A is unconnectable based on the special beacon 50 and a field 70 indicating a next awake period and response opportunity, in accordance with at least one embodiment of the present invention.

In an example embodiment of the invention, each wireless device 100A and the wireless device 100B may be a communications device, PDA, cell phone, laptop or palmtop computer, or the like or it may be a stationary access point, automotive dashboard interface, home electronics interface or other stationary interface or device. Each wireless device 100A and the wireless device 100B may be a remote controller, healthcare monitor, sports sensor, token, key fob, watch, wireless keyboard, gaming pad, body sensor, toy, health care equipment, human interface device, entertainment device, wireless microphone, GPS sensor, or the like.

Figure 2:
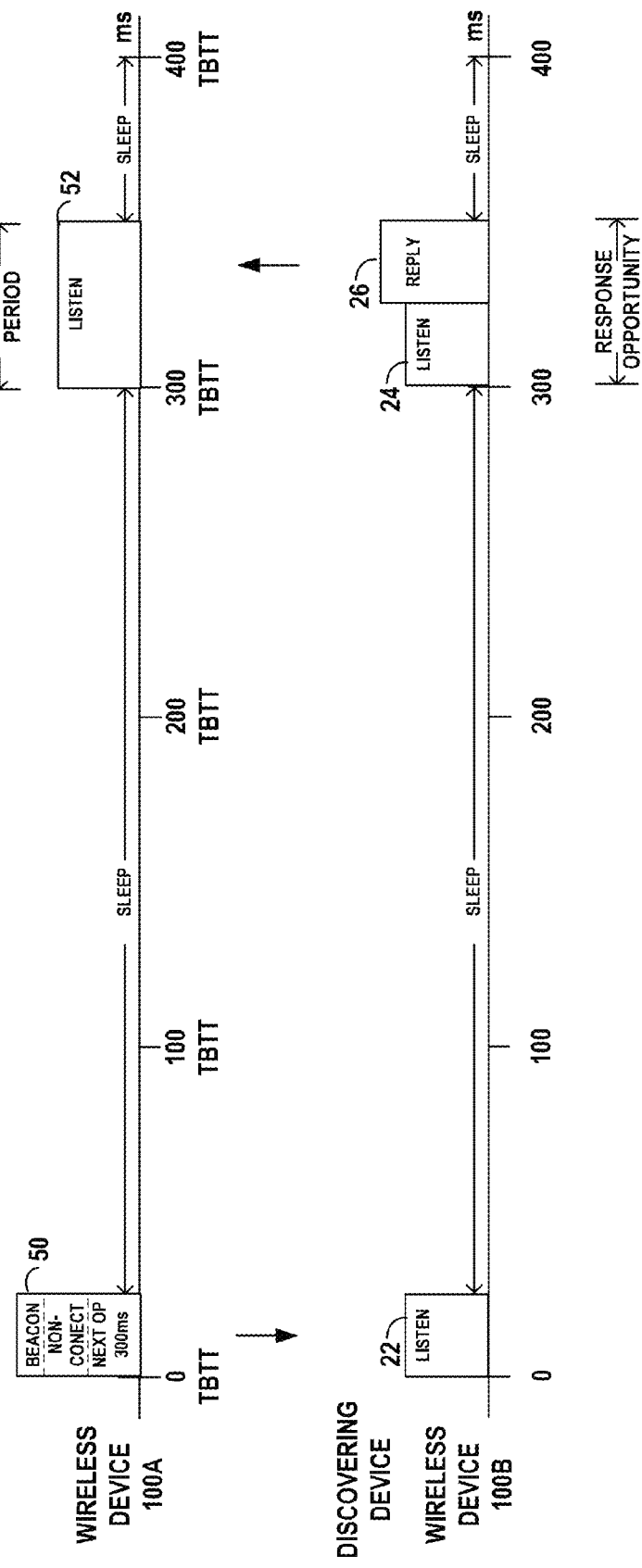
FIG. 2 illustrates an example timing diagram of the first device of FIG. 1, transmitting a first beacon indicating it is unconnectable and indicating a next awake period and response opportunity, the figure further showing the first device entering a sleep mode and sleeping until the next awake period. The figure further shows the first device awaking from the sleep state and determining whether the awake period contains a response opportunity. In an example embodiment of the invention, if the awake period contains a response opportunity, the first device remains in an awake state for listening for responses to the special beacon during the next awake period. The figure further illustrates an example timing diagram of the second device of FIG. 1, receiving the first beacon indicating it is unconnectable and indicating a next awake period and response opportunity, entering a sleep mode and sleeping until the response opportunity. In accordance with an example embodiment of the invention, the second device transmits a reply packet during the response opportunity, in accordance with at least one embodiment of the present invention.

FIG. 2 illustrates an example timing diagram of the first device 100A of FIG. 1, transmitting the special beacon 50 indicating it is unconnectable and indicating a next awake period and response opportunity occurring 300 milliseconds later. The special beacon 50 may be a periodic beacon message. The figure further shows the first device 100A entering a sleep state and sleeping until the next awake period 300 milliseconds later. The figure further shows the first device 100A awaking from the sleep state and determining whether the awake period contains a response opportunity. In an example embodiment of the invention, if the awake period contains a response opportunity, the first device 100A remains in an awake state for listening at 52 for responses to the special beacon 50 during the next awake period. The figure further illustrates an example timing diagram of the second device 100B of FIG. 1, listening at 22 and receiving the special beacon 50 indicating it is unconnectable and indicating a next awake period and response opportunity occurring 300 milliseconds later. The second device 100B enters a sleep state and sleeps until the next indicated response opportunity for connecting the other wireless device. In accordance with an example embodiment of the invention, the second device 100B then awakes and listens for signals from the other wireless device at the indicated time of the response opportunity at 24 and then transmits a reply packet 26 during the next awake period and response opportunity, in accordance with at least one embodiment of the present invention.

An example embodiment of the invention may be applied in any WLAN ad hoc communication protocol, such as the AwareNet protocol. An example embodiment of the invention may be applied in other WLAN protocols, such as the Fast Initial Link Setup defined by IEEE 802.11ai, which enables a fast initial link setup between a mobile station and an access point. In addition to regular/full beacon transmissions, a smaller frame is transmitted more frequently, which provides AP/Network information for initial link setup. The contents of the smaller/more-frequent MAC frame include a time pointer field to point to the next TBTT. In accordance with the invention, the time pointer field may indicate that the MAC frame is unconnectable and may indicate that a next awake period and response opportunity is a selectable duration that is not limited to the next TBTT.

Figure 3A:
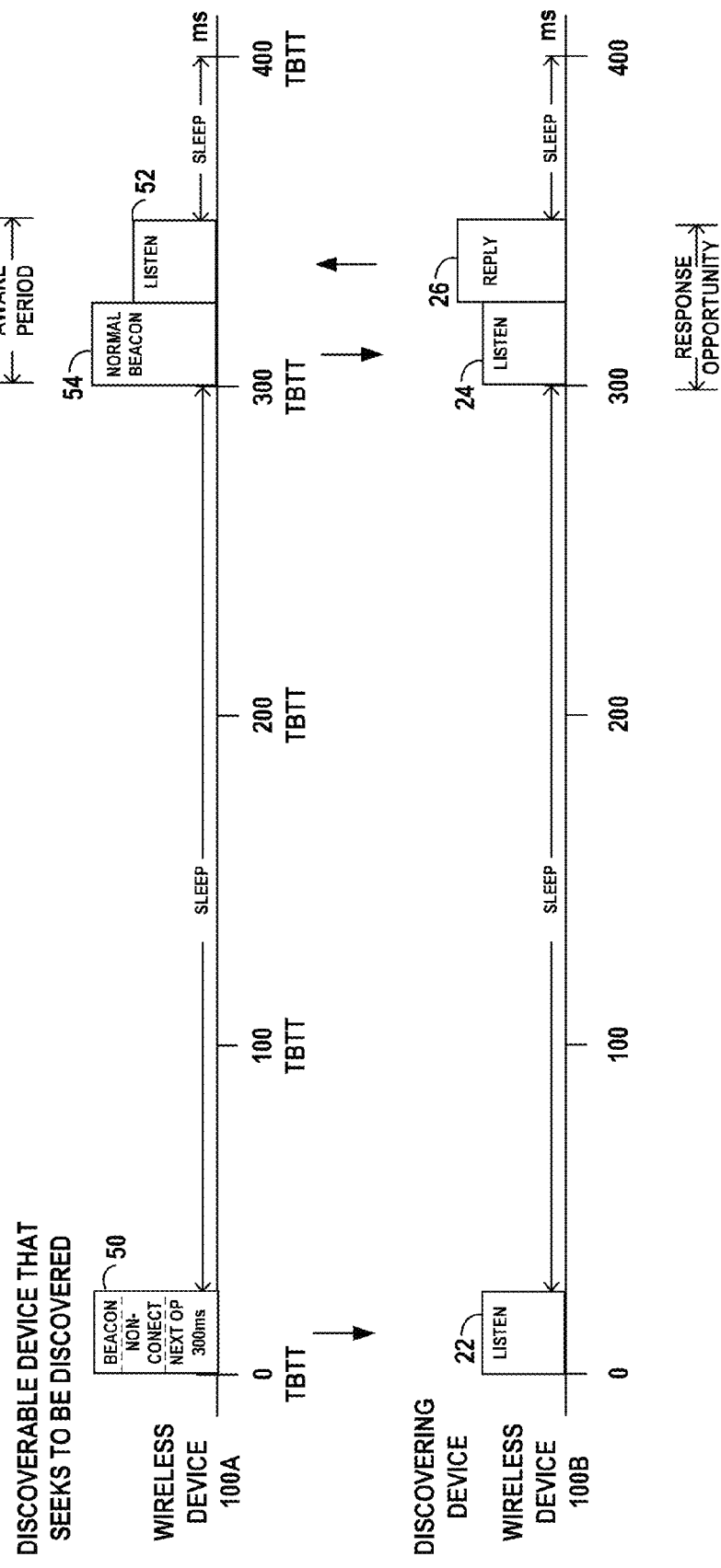
FIG. 3A illustrates an example timing diagram of the first device of FIG. 1, transmitting a first beacon indicating it is unconnectable and indicating a next awake period and response opportunity, the figure further showing the first device entering a sleep mode and sleeping until the next awake period. The figure further shows the first device awaking from the sleep state and determining whether the awake period contains a response opportunity. In an example embodiment of the invention, if the awake period contains a response opportunity, the first device remains in an awake state for transmitting a normal beacon during the next awake period and response opportunity. The first device may then listen for responses to the special beacon or the normal beacon during the next awake period. The figure further illustrates an example timing diagram of the second device of FIG. 1, receiving the first beacon indicating it is unconnectable and indicating a next awake period and response opportunity, entering a sleep mode and sleeping until the response opportunity, and then waking up and receiving the normal beacon during the response opportunity, and in response sending a reply packet, in accordance with at least one embodiment of the present invention.

FIG. 3A illustrates an example timing diagram of the first device 100A of FIG. 1, transmitting the special beacon 50 indicating it is unconnectable and indicating a next awake period and response opportunity 300 milliseconds later, the figure further showing the first device 100A entering a sleep state and sleeping until the next awake period. The figure further shows the first device 100A awaking from the sleep state and determining whether the awake period contains a response opportunity. In an example embodiment of the invention, if the awake period contains a response opportunity, the first device 100A remains in an awake state for transmitting a normal beacon 54 during the next awake period and response opportunity. The first device 100A may then listen at 52 for responses to the special beacon 50 or the normal beacon 54 during the next awake period. The figure further illustrates an example timing diagram of the second device 100B of FIG. 1, listening at 22 and receiving the special beacon 50 indicating it is unconnectable and indicating a next awake period and response opportunity 300 milliseconds later. The figure shows the second device 100B entering a sleep state and sleeps until the next indicated response opportunity for connecting the other wireless device 300 milliseconds later. In accordance with an example embodiment of the invention, the figure shows the second device 100B waking up during the response opportunity, listening at 24 for signals from the other wireless device at the indicated time of the response opportunity and receiving the normal beacon 54, which indicates a response opportunity. The figure shows the second device 100B, in response, sending a reply packet 26, in accordance with at least one embodiment of the present invention.

Figure 3B:
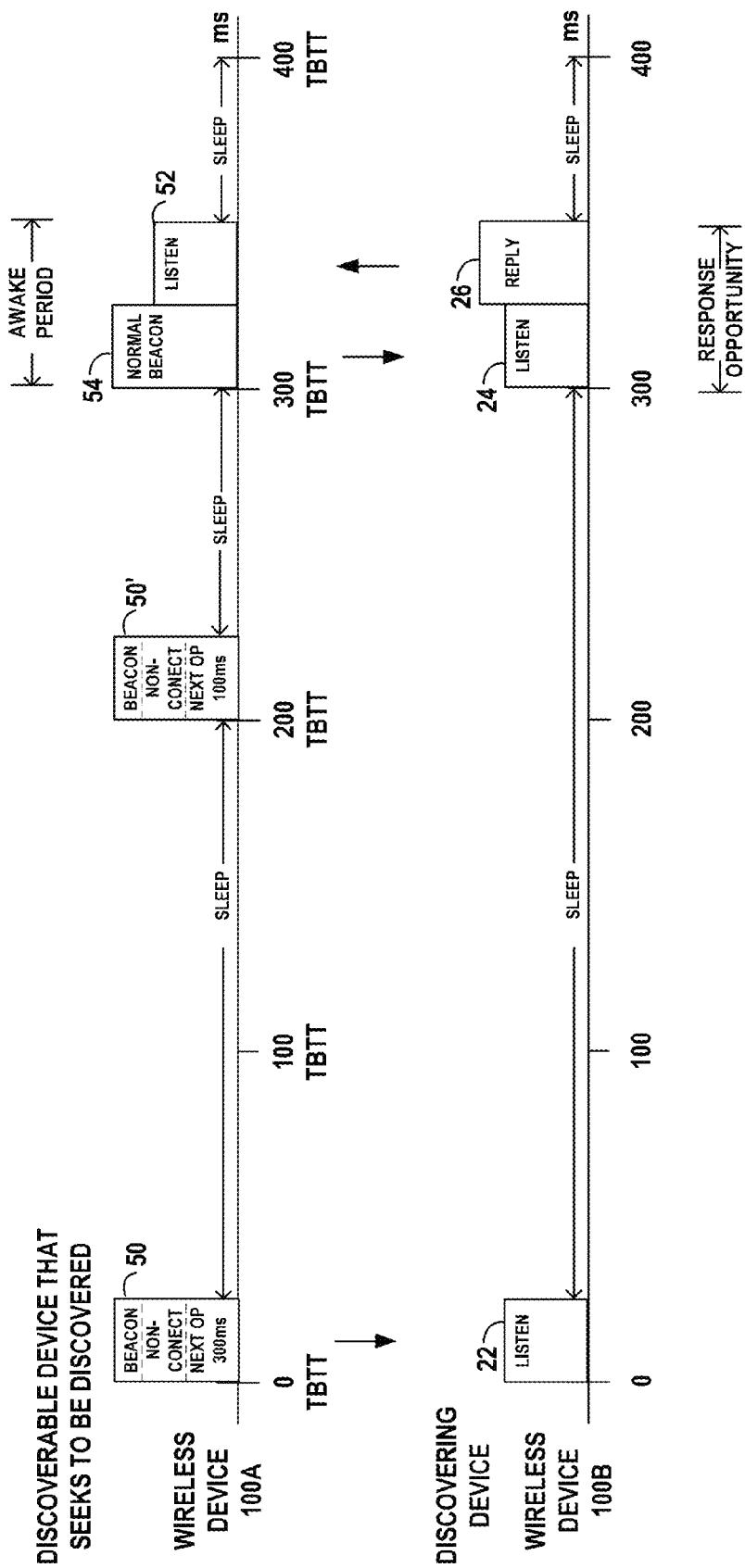
FIG. 3B illustrates an example timing diagram of the first device of FIG. 1, transmitting a first beacon indicating it is unconnectable and indicating a next awake period and response opportunity are three beacon periods later. The figure further shows the first device entering a sleep mode and sleeping for two beacon periods, waking up and transmitting a second beacon indicating it is unconnectable and indicating a next awake period and response opportunity is one beacon period later until the next awake period. The figure further shows the first device awaking from the sleep state and determining whether the awake period contains a response opportunity. In an example embodiment of the invention, if the awake period contains a response opportunity, the first device remains in an awake state for transmitting a normal beacon during the next awake period and response opportunity. The first device may then listen for responses to the special beacon or the normal beacon during the next awake period. The figure further illustrates an example timing diagram of the second device of FIG. 1, receiving the first beacon indicating it is unconnectable and indicating a next awake period and response opportunity three beacon periods later, entering a sleep mode and sleeping for three beacon periods until the response opportunity, and then waking up and receiving the normal beacon during the response opportunity, and in response sending a reply packet, in accordance with at least one embodiment of the present invention.

FIG. 3B illustrates an example timing diagram of the first device 100A of FIG. 1, transmitting a first beacon 50 indicating it is unconnectable and indicating a next awake period and response opportunity is 300 milliseconds or three beacon periods later. The figure further shows the first device 100A entering a sleep mode and sleeping for 200 milliseconds or two beacon periods. At the end of 200 milliseconds or two beacon periods, the first device 100A wakes up and transmits a second beacon 50' indicating it is unconnectable and indicating the next awake period and response opportunity is 100 milliseconds or one beacon period later until the next awake period. The figure further shows the first device 100A awaking from the sleep state at the end of the third beacon period and determining whether the awake period contains a response opportunity. In an example embodiment of the invention, if the awake period contains a response opportunity, the first device 100A remains in an awake state for transmitting a normal beacon 54 during the next awake period and response opportunity. The first device 100A may then listen at 52 for responses to the special beacon 50 or the normal beacon 54 during the next awake period. The figure further illustrates an example timing diagram of the second device 100B of FIG. 1, listening at 22 and receiving the first beacon 50 indicating it is unconnectable and indicating a next awake period and response opportunity is 300 milliseconds or three beacon periods later, entering a sleep mode and sleeping until the next indicated response opportunity for connecting the other wireless device, for 300 milliseconds or three beacon periods until the response opportunity. The second device 100B then wakes up, listens for signals from the other wireless device at the indicated time of the response opportunity at 24, and receives the normal beacon 54 during the response opportunity. In response, the second device 100B sends a reply packet 26, in accordance with at least one embodiment of the present invention, in accordance with at least one embodiment of the present invention.

Figure 4:
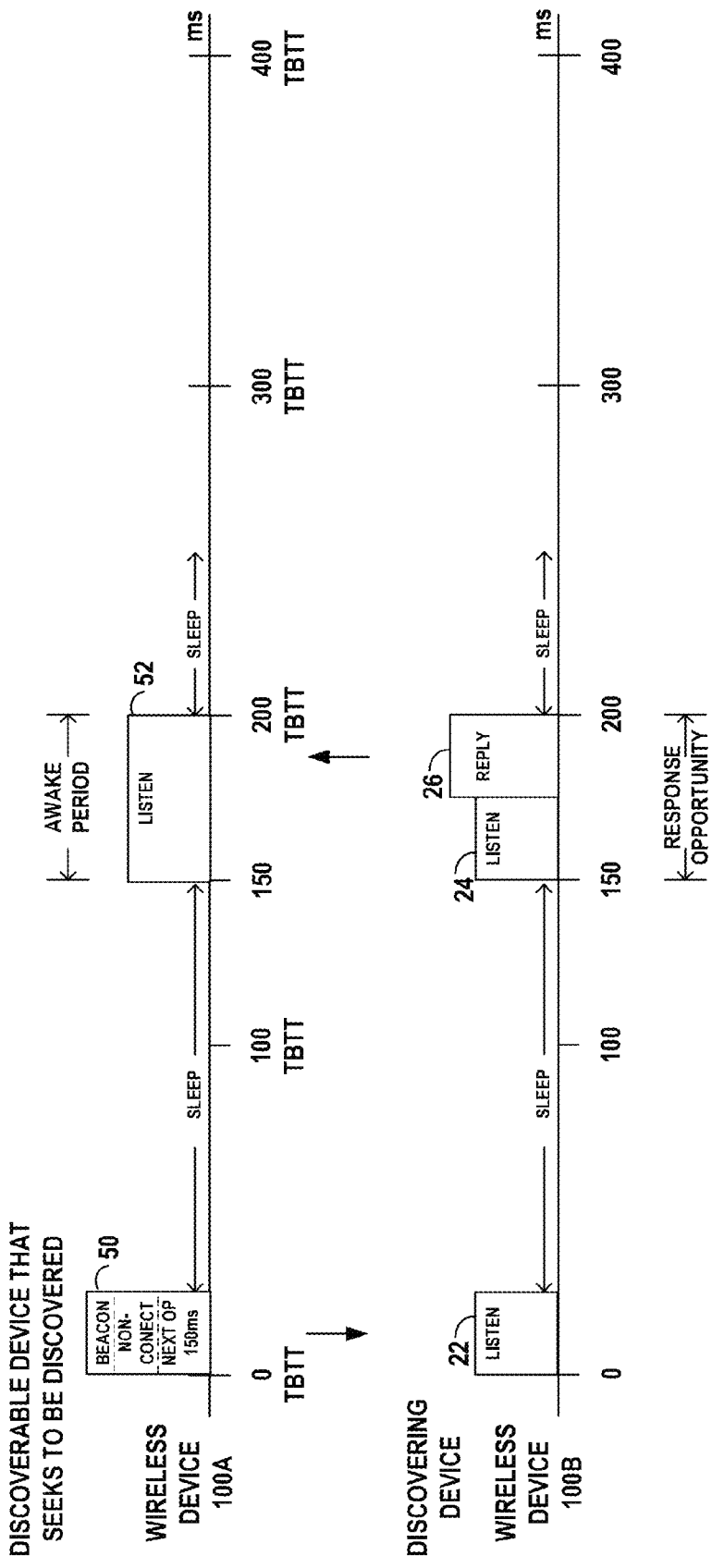
FIG. 4 illustrates an example timing diagram of the first device of FIG. 1, transmitting a first beacon indicating it is unconnectable and indicating a next awake period and response opportunity occurring at a different time from that in FIG. 3A, the figure further showing the first device entering a sleep mode and sleeping until the next awake period. The figure further shows the first device awaking from the sleep state and determining whether the awake period contains a response opportunity. In an example embodiment of the invention, if the awake period contains a response opportunity, the first device remains in an awake state for listening for responses to the special beacon during the next awake period. The figure further illustrates an example timing diagram of the second device of FIG. 1, receiving the first beacon indicating it is unconnectable and indicating a next awake period and response opportunity, entering a sleep mode and sleeping until the response opportunity. In accordance with an example embodiment of the invention, the second device then listens and then transmits a reply packet during the next awake period and response opportunity, in accordance with at least one embodiment of the present invention.

FIG. 4 illustrates an example timing diagram of the first device 100A of FIG. 1, transmitting the special beacon 50 indicating it is unconnectable and indicating a next awake period and response opportunity with a time interval occurring 150 milliseconds later, which is different from the interval of 300 milliseconds in FIG. 3. The figure further shows the first device 100A entering a sleep state and sleeping 150 milliseconds until the next awake period and then listening during the next awake period. The figure further shows the first device 100A awaking from the sleep state and determining whether the awake period contains a response opportunity. In an example embodiment of the invention, if the awake period contains a response opportunity, the first device 100A remains in an awake state for listening at 52 for responses to the special beacon 50 during the next awake period. The figure further illustrates an example timing diagram of the second device 100B of FIG. 1, listening at 22 and receiving the special beacon 50 indicating it is unconnectable and indicating a next awake period and response opportunity, entering a sleep state and sleeping 150 milliseconds until the next indicated response opportunity for connecting the other wireless device. In accordance with an example embodiment of the invention, the second device 100B then listens for signals from the other wireless device at the indicated time of the response opportunity at 24 and transmits a reply packet 26 during the response opportunity, in accordance with at least one embodiment of the present invention.

FIG. 5 illustrates an example timing diagram of the first device 100A of FIG. 1, transmitting the special beacon 50 indicating it is unconnectable and indicating a next awake period and response opportunity 200 milliseconds later. The figure further shows the first device 100A entering a sleep state and sleeping until the next awake period. The figure further shows the first device 100A awaking from the sleep state and determining whether the awake period contains a response opportunity. In an example embodiment of the invention, if the awake period contains a response opportunity, the first device 100A remains in an awake state for transmitting a normal beacon 54 during the next awake period and response opportunity. The first device 100A may then listen at 52 for responses to the special beacon 50 or the normal beacon 54 during the next awake period. The first device 100A may later transmit a second normal beacon 54' at a next target beacon transmission time (TBTT). After transmitting a normal beacon frame 54, the discoverable device 100A that seeks to be discovered may remain awake and listen to the channel for some time interval in order to receive possible responses from discovering device 100B, triggered by the beacon frame 54. The figure further illustrates an example timing diagram of the second device 100B of FIG. 1, receiving the special beacon 50 indicating it is unconnectable and indicating a next awake period and response opportunity 200 milliseconds later, entering a sleep state and sleeping until the next indicated response opportunity for connecting the other wireless device. In accordance with an example embodiment of the invention, the figure shows the second device 100B waking up during the response opportunity, listening for signals from the other wireless device at the indicated time of the response opportunity at 24 and receiving the normal beacon 54, which indicates a response opportunity. The figure shows the second device 100B, in response, sending a reply packet 26, in accordance with at least one embodiment of the present invention.

FIG. 6 is an example functional block diagram of the two ad hoc wireless network devices of FIG. 1, with a first device 100A, a discoverable device that seeks to be discovered, transmitting the special beacon 50 indicating it is unconnectable, meaning that a connection setup is possible only after a later beacon or an indicated time. The first device 100A may conserve energy by skipping the normal receiving period after transmitting the special beacon 50 and returning directly to a sleep state. The special beacon 50 also indicates a next awake period and response opportunity to a second device 100B, a discovering device, enabling the second device 100B to conserve energy by returning to a sleep state until close to the start of the indicated connection initiation opportunity, in accordance with at least one embodiment of the present invention.

The figure shows an example embodiment of the wireless device 100B receiving the special beacon 50 from the wireless device 100A and an example embodiment of the internal architecture of both the wireless devices 100A and 100B. The figure shows an example embodiment of the wireless device 100B collecting TSF information from beacons received during passive scanning periods. The wireless device 100B listens with radio 208 on a channel for a period of time and may add any received beacons to its cached BSSID scan list in its RAM 262. The figure shows the wireless device 100B receiving a special beacon 50 from the wireless device 100A.

In an example embodiment of the invention, the wireless device 100A and the wireless device 100B may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device 100A and the wireless device 100B may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an example embodiment of the invention, the wireless device 100A and the wireless device 100B each include the awareness protocol stack 202.

In an example embodiment of the invention, the awareness protocol stack 202 may include the Awareness Layer, the Community Layer, the Network Layer, and the Link Layer that is divided into two sub layers: the logical link control (LLC) and the media access control (MAC). The Neighbor Table 142 in the logical link control (LLC), may include a list of all the network instances having member neighboring devices that have been heard from in the recent past. In an example embodiment of the invention, for each network instance in the neighbor table, a record or entry may be made of at least its SSID and BSSID, which are recorded from the values in the most recently received beacon or beacon response message from the network instance. In an example embodiment of the invention, the neighbor table may also include the TSF value from a network instance, and it may be updated from the beacons and beacon response messages received from the network instance. The record may also include the received signal strength and an identifying indicium entered by the user or the application that identifies past memberships with the network instance, conversational sessions with a user of a device in the network instance, or other characteristics of the network instance. The Neighbor Table 142 in the logical link control (LLC) is updated when reception reports and scan reports are received from the MAC layer. The MAC passes to the LLC in the reception report, the SSID, BSSID, and other values of all the messages received during the previous awake period.

In an example embodiment of the invention, the logical link control (LLC) may make a merging or join decision to join a particular targeted network instance or beacon group, either autonomously or in response to an application. The logical link control (LLC) issues a join-command, specifying the particular targeted network instance or beacon group to join. The logical link control (LLC) looks up the specified identifying indicium, the specified received signal strength or other specified characteristic recorded in the Neighbor Table and obtains the SSID and BSSID, and other values of all the messages received during the previous awake period.

Figure 8:
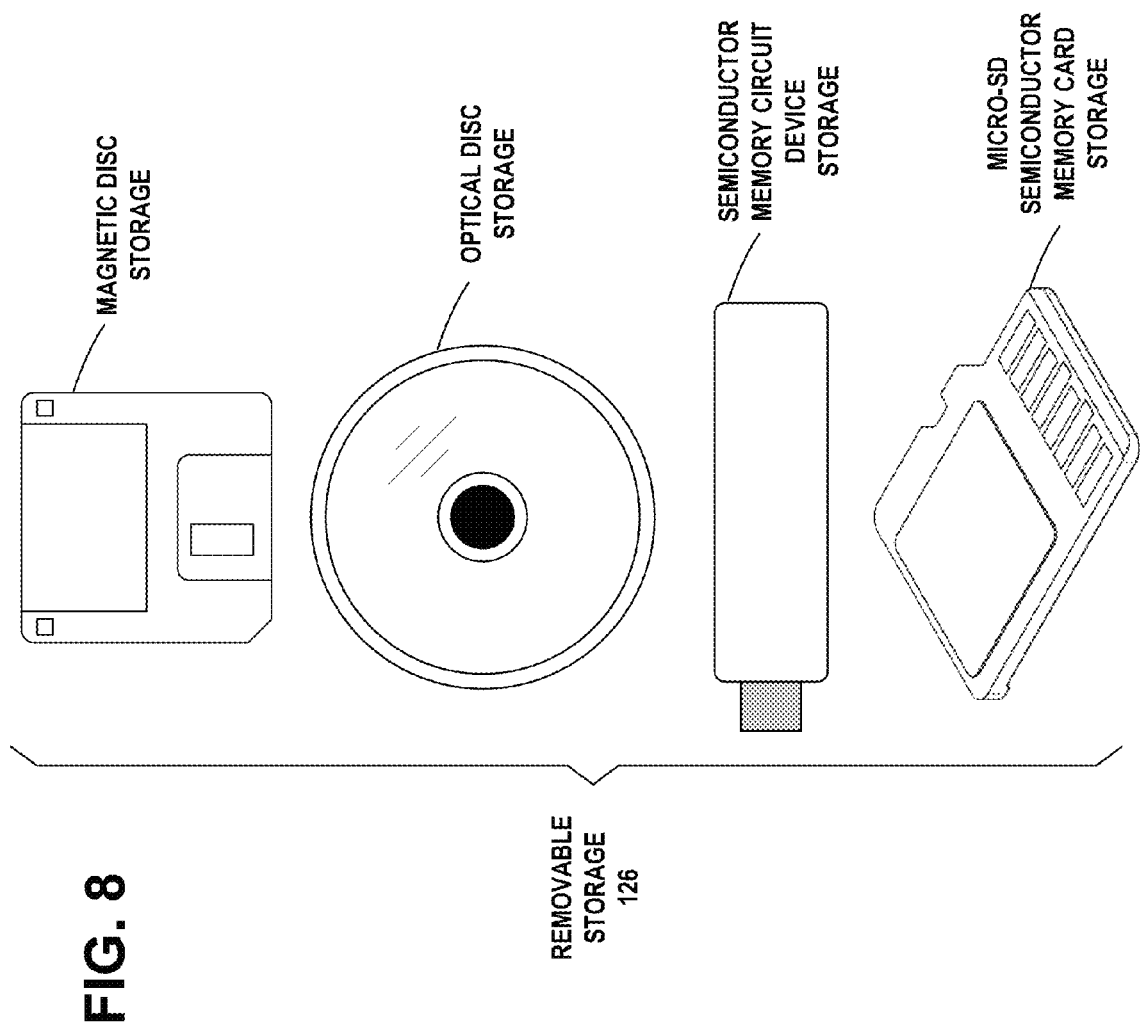
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device 100A and the wireless device 100B from a computer program product or article of manufacture in the form of computer-usable media such as resident memory devices, smart cards or other removable memory devices, as illustrated in FIG. 8. Alternately, they may be embodied as integrated circuit logic in the form of programmed logic arrays or custom designed application specific integrated circuits (ASIC). The radio 208 in the each of the wireless device 100A and the wireless device 100B may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device 100A and the wireless device 100B for execution of the program code for example by the CPUs 260 and/or 261. Removable storage media 126 are shown in FIG. 7.

FIG. 7A is an example flow diagram 300 of operational steps in the first wireless device 100A, the discoverable device that seeks to be discovered of FIG. 1, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: transmitting, by a wireless device, a periodic beacon message, the beacon message including an indication that the wireless device is currently unconnectable and indicating a next awake period and response opportunity for connecting the wireless device;

Step 304: entering, by the wireless device, a sleep state until the next awake period;

Step 306: awaking from the sleep state for transmitting the periodic beacon message and determining whether the awake period contains a response opportunity; and Step 308: when determining that the awake period contains a response opportunity, remaining in an awake state for listening for responses to the periodic beacon message.

In an example embodiment of the invention, there may be multiple unconnectable beacons transmitted before a response opportunity is indicated, for example nine consecutive unconnectable beacons may be transmitted followed by the transmission of one connectable beacon.

FIG. 7B is an example flow diagram 350 of operational steps in the second wireless device, the discovering device of FIG. 1, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 352: receiving, by a wireless device, a periodic beacon message from another wireless device, indicating it is unconnectable and indicating a next awake period and response opportunity for connecting the wireless device;

Step 354: sleeping, by the wireless device, until the next indicated response opportunity for connecting the other wireless device; and Step 356: awaking and listening for signals from the other wireless device at the indicated time of the response opportunity.

FIG. 8 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    transmitting, by a wireless device, a periodic beacon message, the beacon message including an indication that the wireless device is currently unconnectable and indicating a next awake period and response opportunity for connecting the wireless device;
    entering, by the wireless device, a sleep state until the next awake period;
    awaking from the sleep state for transmitting the periodic beacon message and determining whether the awake period contains a response opportunity; and
    when determining that the awake period contains a response opportunity, remaining in an awake state for listening for responses to the periodic beacon message.

2. The method of claim 1, further comprising:
    wherein the periodic beacon message indicates that a connection setup is possible only after a later beacon or an indicated time.

3. A method, comprising:
    transmitting, by a wireless device, a periodic beacon message, the beacon message including an indication that the wireless device is currently unconnectable and indicating a next awake period and response opportunity for connecting the wireless device;
    entering, by the wireless device, a sleep state until the next awake period;
    awaking from the sleep state for transmitting the periodic beacon message and determining whether the awake period contains a response opportunity;

when determining that the awake period contains a response opportunity, remaining in an awake state for listening for responses to the periodic beacon message; and transmitting, by the wireless device, a later beacon message after determining that the awake period contains a response opportunity, to indicate the response opportunity to devices receiving the later beacon message.

4. A method, comprising:

transmitting, by a wireless device, a periodic beacon message, the beacon message including an indication that the wireless device is currently unconnectable and indicating a next awake period and response opportunity for connecting the wireless device;

entering, by the wireless device, a sleep state until the next awake period;

awaking from the sleep state for transmitting the periodic beacon message and determining whether the awake period contains a response opportunity;

when determining that the awake period contains a response opportunity, remaining in an awake state for listening for responses to the periodic beacon message;

selecting, by the wireless device, a new duration before the next awake period and response opportunity;

transmitting, by the wireless device, a next periodic beacon message indicating it is unconnectable and indicating the new duration before the next awake period and response opportunity;

entering, by the wireless device, a sleep state for the new duration;

awaking from the sleep state for transmitting a later periodic beacon message and determining whether the awake period contains a response opportunity; and when determining that the awake period contains a response opportunity, remaining in the awake state for listening for responses to the later periodic beacon message.

5. A method, comprising:

receiving, by a wireless device, a periodic beacon message from another wireless device, indicating it is unconnectable and indicating a next awake period and response opportunity for connecting the wireless device;

sleeping, by the wireless device, until the next indicated response opportunity for connecting the other wireless device; and awaking and listening for signals from the other wireless device at the indicated time of the response opportunity.

6. The method of claim 5, further comprising:

wherein the periodic beacon message indicates that a connection setup is possible only after a later beacon or an indicated time.

7. A method, comprising:

receiving, by a wireless device, a periodic beacon message from another wireless device, indicating it is unconnectable and indicating a next awake period and response opportunity for connecting the wireless device;

sleeping, by the wireless device, until the next indicated response opportunity for connecting the other wireless device;

awaking and listening for signals from the other wireless device at the indicated time of the response opportunity; and receiving, by the wireless device, a later periodic beacon message at the response opportunity to indicate a response opportunity to devices receiving the second message.

8. A method, comprising:

receiving, by a wireless device, a periodic beacon message from another wireless device, indicating it is unconnectable and indicating a next awake period and response opportunity for connecting the wireless device;

sleeping, by the wireless device, until the next indicated response opportunity for connecting the other wireless device;

awaking and listening for signals from the other wireless device at the indicated time of the response opportunity;

receiving, by the wireless device, a next periodic beacon message indicating it is unconnectable and indicating the new duration before the next awake period and response opportunity;

entering, by the wireless device, a sleep state for the new duration before the next indicated response opportunity for connecting the other wireless device; and awaking from the sleep state at the end of the new duration and listening for signals from the other wireless device indicating a response opportunity.

9. An apparatus, comprising:

at least one processor;

at least one memory including computer program code;

the at least one memory and the computer program code configured to, with the at least one processor, cause the apparatus at least to:

transmit a periodic beacon message, the beacon message including an indication that the apparatus is currently unconnectable and indicating a next awake period and response opportunity for connecting the apparatus;

enter a sleep state until the next awake period;

awake from the sleep state for transmitting the periodic beacon message and determining whether the awake period contains a response opportunity; and when determining that the awake period contains a response opportunity, remaining in an awake state for listening for responses to the periodic beacon message.

10. The apparatus of claim 9, further comprising:

wherein the periodic beacon message indicates that a connection setup is possible only after a later beacon or an indicated time.

11. An apparatus, comprising:

at least one processor;

at least one memory including computer program code;

the at least one memory and the computer program code configured to, with the at least one processor, cause the apparatus at least to:

transmit a periodic beacon message, the beacon message including an indication that the apparatus is currently unconnectable and indicating a next awake period and response opportunity for connecting the apparatus;

enter a sleep state until the next awake period;

awake from the sleep state for transmitting the periodic beacon message and determining whether the awake period contains a response opportunity;

when determining that the awake period contains a response opportunity, remaining in an awake state for listening for responses to the periodic beacon message; and transmit a later beacon message after determining that the awake period contains a response opportunity, to indicate the response opportunity to devices receiving the later beacon message.

12. An apparatus, comprising:

at least one processor;

at least one memory including computer program code;

the at least one memory and the computer program code configured to, with the at least one processor, cause the apparatus at least to:

transmit a periodic beacon message, the beacon message including an indication that the apparatus is currently unconnectable and indicating a next awake period and response opportunity for connecting the apparatus;

enter a sleep state until the next awake period;

awake from the sleep state for transmitting the periodic beacon message and determining whether the awake period contains a response opportunity;

when determining that the awake period contains a response opportunity, remaining in an awake state for listening for responses to the periodic beacon message;

selecting, by the wireless device, a new duration before the next awake period and response opportunity;

transmit a next periodic beacon message indicating it is unconnectable and indicating the new duration before the next awake period and response opportunity;

enter a sleep state for the new duration;

awake from the sleep state for transmitting a later periodic beacon message and determining whether the awake period contains a response opportunity; and when determining that the awake period contains a response opportunity, remain in the awake state for listening for responses to the later periodic beacon message.

13. An apparatus, comprising:

at least one processor;

at least one memory including computer program code;

the at least one memory and the computer program code configured to, with the at least one processor, cause the apparatus at least to:

receive a periodic beacon message from another wireless device, indicating it is unconnectable and indicating a next awake period and response opportunity for connecting the apparatus;

sleep until the next indicated response opportunity for connecting the other wireless device; and awake and listen for signals from the other wireless device at the indicated time of the response opportunity.

14. The apparatus of claim 13, further comprising:

wherein the periodic beacon message indicates that a connection setup is possible only after a later beacon or an indicated time.

15. An apparatus, comprising:

at least one processor;

at least one memory including computer program code;

the at least one memory and the computer program code configured to, with the at least one processor, cause the apparatus at least to:

receive a periodic beacon message from another wireless device, indicating it is unconnectable and indicating a next awake period and response opportunity for connecting the apparatus;

sleep until the next indicated response opportunity for connecting the other wireless device;

awake and listen for signals from the other wireless device at the indicated time of the response opportunity; and receive a later periodic beacon message at the response opportunity to indicate a response opportunity to devices receiving the second message.

16. An apparatus, comprising:

at least one processor;

at least one memory including computer program code;

the at least one memory and the computer program code configured to, with the at least one processor, cause the apparatus at least to:

receive a periodic beacon message from another wireless device, indicating it is unconnectable and indicating a next awake period and response opportunity for connecting the apparatus;

sleep until the next indicated response opportunity for connecting the other wireless device;

awake and listen for signals from the other wireless device at the indicated time of the response opportunity;

receive a next periodic beacon message indicating it is unconnectable and indicating the new duration before the next awake period and response opportunity;

enter a sleep state for the new duration before the next indicated response opportunity for connecting the other wireless device; and awake from the sleep state at the end of the new duration and listen for signals from the other wireless device indicating a response opportunity.

17. A computer program product comprising computer executable program code recorded on a computer readable non-transitory storage medium, the computer executable program code comprising:

code for transmitting, by a wireless device, a periodic beacon message, the beacon message including an indication that the wireless device is currently unconnectable and indicating a next awake period and response opportunity for connecting the wireless device;

code for entering, by the wireless device, a sleep state until the next awake period;

code for awaking from the sleep state for transmitting the periodic beacon message and determining whether the awake period contains a response opportunity; and code for when determining that the awake period contains a response opportunity, remaining in an awake state for listening for responses to the periodic beacon message.

18. A computer program product comprising computer executable program code recorded on a computer readable non-transitory storage medium, the computer executable program code comprising:

code for receiving, by a wireless device, a periodic beacon message from another wireless device, indicating it is unconnectable and indicating a next awake period and response opportunity for connecting the wireless device;

code for sleeping, by the wireless device, until the next indicated response opportunity for connecting the other wireless device; and code for awaking and listening for signals from the other wireless device at the indicated time of the response opportunity.

* * * * *